(12) United States Patent
Puglisi

(10) Patent No.: US 8,022,656 B2
(45) Date of Patent: Sep. 20, 2011

(54) ELECTRIC BRAKE CIRCUIT FOR HOLDING AN ALTERNATING CURRENT MOTOR ROTOR STATIONARY

(76) Inventor: Daniel G. Puglisi, Casselberry, FL (US)

( * ) Notice: Subject to any disclaimer, the term of this patent is extended or adjusted under 35 U.S.C. 154(b) by 498 days.

(21) Appl. No.: 12/228,112

(22) Filed: Aug. 11, 2008

(65) Prior Publication Data

US 2009/0079381 A1    Mar. 26, 2009

Related U.S. Application Data

(63) Continuation-in-part of application No. 11/901,994, filed on Sep. 21, 2007, now Pat. No. 7,819,561.

(51) Int. Cl.
*H02P 3/18* (2006.01)
(52) U.S. Cl. ............... 318/762; 318/364; 318/375
(58) Field of Classification Search .......... 318/762, 318/364, 375, 365, 372, 373, 760, 716, 759
See application file for complete search history.

(56) References Cited

U.S. PATENT DOCUMENTS

| | | | |
|---|---|---|---|
| 3,475,669 A | 10/1969 | Oltendorf | |
| 3,798,523 A | 3/1974 | Gross | |
| 3,872,363 A | 3/1975 | Gross | |
| 4,185,770 A | 1/1980 | Nagel | |
| 4,195,255 A | 3/1980 | Guttmann | |
| 4,560,913 A * | 12/1985 | Min | 318/760 |
| 4,761,600 A * | 8/1988 | D'Atre et al. | 318/759 |
| 4,990,844 A | 2/1991 | Gritter et al. | |
| 5,705,903 A | 1/1998 | Hastings | |
| 6,906,493 B1 | 6/2005 | Ramirez, Jr. et al. | |
| 2006/0006828 A1* | 1/2006 | Kimura et al. | 318/716 |

* cited by examiner

Primary Examiner — Karen Masih
(74) Attorney, Agent, or Firm — William M. Hobby, III

(57) ABSTRACT

An electric brake circuit for holding an alternating current motor rotor stationary uses a direct current brake acting on an AC motor rotor. The rotor has at least one groove formed therein positioned for alignment with at least one AC motor pole when switching from an alternating current to DC. The AC induction motor holds the rotor stationary against a heavier load by using the grooved rotor with the grooves formed in the rotor aligning with the AC motor's poles.

8 Claims, 1 Drawing Sheet

ELECTRIC BRAKE CIRCUIT FOR HOLDING AN ALTERNATING CURRENT MOTOR ROTOR STATIONARY

This patent application is a continuation-in-part application of my pending U.S. patent application Ser. No. 11/901,994, filed Sep. 21, 2007 for a Retractable Light Fixture.

BACKGROUND OF THE INVENTION

Induction motors are among the simplest and most rugged electric motors and are made up of a wound stator and a rotor assembly. The rotor assembly resembles a squirrel cage from one end so that the motor is commonly called a squirrel cage motor. A shaded pole motor is an AC single phase induction motor which has a squirrel cage rotor. Single phase motors require some means for producing a rotating magnetic field for starting the motor. The shaded pole motor, a part of the face of each field pole carries a copper ring called the shading coil which induces a rotating magnetic field.

In many applications, it is desirable to bring an AC motor to a rapid and controlled stop. One technique for accomplishing this in an AC motor is to apply a direct current across the windings of the motor. The application of direct current to the windings generates an electromagnetic force within the motor to stop the rotor with a rapid braking action. In braking systems using a synchronous motor, a starting capacitor in the AC motor may be charged during operation of the motor and then electrically coupled to the windings of the AC motor to produce a braking force on the motor when the motor is switched off. However, sometimes braking affects afforded by the starting capacitor does not stop the motor within the desired time due to the limited charge the starting capacitor can store to increase the braking affects. Some prior art systems utilize a braking capacitor having a greater storage capacity. During the motor's operation, the braking capacitor is charged. When the motor is stopped, the braking capacitor is applied across the windings of the motor to bring the motor to a rapid halt.

The present invention is directed towards an alternating current induction motor which switches from an AC load to applying a DC current to the motor for purposes of holding or locking the rotor in place against torque being placed on the motor shaft and on the rotor and to accomplish a greater holding ability of the rotor with a smaller amount of DC current.

Prior art electric braking systems for alternating current motors can be seen in the Hastings U.S. Pat. No. 5,705,903 for an electric brake circuit for bringing an alternating current motor to a rapid halt which uses a braking capacitor charged to a preselected voltage. In the Oltendorf, U.S. Pat. No. 3,475,669, a variable dynamic direct current brake circuit for an AC motor is provided while in the Gross U.S. Pat. No. 3,872,363 an electric motor braking system is utilized. In the Gross U.S. Pat. No. 3,798,523, a single phase induction motor brake uses a capacitor and a current limiting impedance in a DC braking circuit. The Guttmann, U.S. Pat. No. 4,195,255, is for an electric brake for AC motors which has a control rectifying means for applying direct current to the motor. The Ramirez, Jr. et al., U.S. Pat. No. 6,906,493, provides for an electric brake for a motor by applying a direct current voltage from a capacitor across terminals of an alternating current motor. The Gritter et al., U.S. Pat. No. 4,990,844, is a DC braking of an inverter driven AC motor. In the Nagel, U.S. Pat. No. 4,185,770, an automatic flue damper control system is normally energized to hold the damper closed as a mechanical biased mechanism to move the damper to an open position in the absence of motor energization. A braking arrangement applies a direct current to the motor for dynamic braking as the damper closely approaches its open position.

In contrast to this prior art, the present invention is directed towards a single phase induction motor in which direct current is applied to the terminals of an alternating current motor for purposes of holding the rotor in a stationary position against a biasing torque placed on the rotor. The present rotor holding circuit is accomplished using a reduced amount of electric power.

SUMMARY OF THE INVENTION

An electric brake circuit for holding an alternating current motor rotor stationary. An AC power source is connected to an alternating current motor having a stator having at least one pole and a rotor with the drive shaft attached. The rotor has at least one groove formed therein positioned for alignment with at least one AC motor pole when direct current is applied to the AC motor. An AC to DC converter is coupled to the AC source for converting an alternating current to a direct current. The AC to DC converter is coupled to the AC motor. A brake actuator is coupled between the alternating current power and the AC motor for applying an alternating current to the AC motor in one position and to the AC to DC converter in a second position for braking and holding the alternating current motor rotor with each rotor groove aligning with one stator pole to provide an AC motor DC holding brake having a greater holding force for holding the rotor in a stationary position. The AC motor is an induction motor and may be a shaded pole motor having a number of poles while the rotor has grooves matching and aligning with each of the poles. The AC motor electric brake circuit may have an actuator which is a timed delay relay, automatically actuating the electric brake circuit when power is cut to the AC motor. The AC motor shaft is connected to a gear box having an output shaft.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
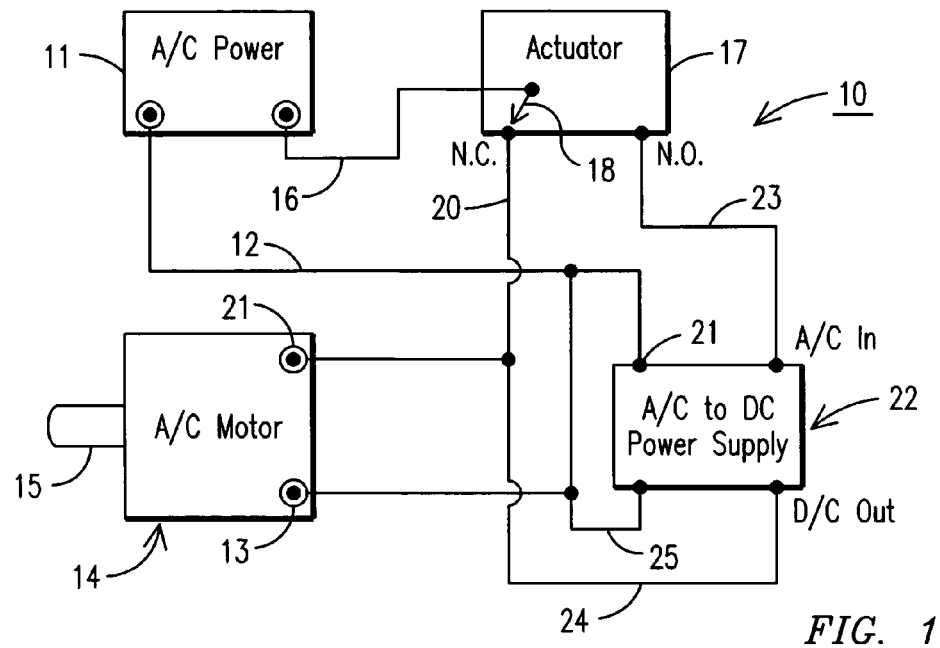
FIG. 1 is a block diagram of the circuit in accordance with the present invention.

Referring to FIG. 1 of the drawings, a circuit in accordance with the present invention has an alternating current power source 11 having a power line 12 connecting to one terminal 13 of an alternating current shaded pole motor 14. The motor 14 has an output shaft 15. A second line 16 from the AC power source 11 is connected to an actuator 17. The actuator 17 may be an actual switch or a microswitch or a time delay relay as desired and has the switch element 18 which directs the current flow from line 16 of the alternating current lines into a line 20 which connects to a terminal 21 of the induction motor 14. The power line 12 is also connected to one terminal 21 of the AC to DC converter. The power supply 22 has a power line 23 connected between actuator 17 and the AC to DC power supply 22.

As seen in FIG. 1, when the actuator is connected to the terminal in line 20, there is no power from line 16 passing to line 23 and to the AC to DC power supply. The power line 12 is always connected to both the AC to DC power supply and to one side of the AC shaded pole motor. The AC to DC power supply has an electric line 24 connected to the output and to the terminal 21 of the motor 14. The AC to DC power supply 22 also has an output line 25 which connects directly to the terminal 13 of the motor 14. Referring to the actuator of FIG. 1, there are two principle ways to physically switch power from AC to DC. The first uses a limit switch that switches the AC off and DC on when it is activated. The second uses a timed delay relay which switches AC to DC after a predetermined time frame. The timed delay relay has the advantage that there would be no need to install a limit switch remotely or otherwise to active the hold system. This would be desirable in the installation of a timed delay DC hold circuit in an existing fire dampener, for instance.

In this circuit, the AC power is applied to the AC motor for operating the motor when the actuator switch is switched to operatively connect lines 16 and line 20. Both sides of the AC power are directly connected to the motor 14. When the actuator 17 switches the power from line 16 to line 23, the AC power is switched to the AC to DC converter. However, the AC to DC power supply is activated so that DC current is applied to lines 24 and 25 and to the terminals 21 and 13 of the shaded pole motor 14 to apply a braking force to the motor 14. In the present invention, it is desired to hold the shaft 15 from the rotor in position using as little electric power as possible until such time it is desirable to actuate the AC motor.

Figure 3:
FIG. 3 is a perspective view of the rotor of the shaded pole motor of FIG. 2.
Figure 2:
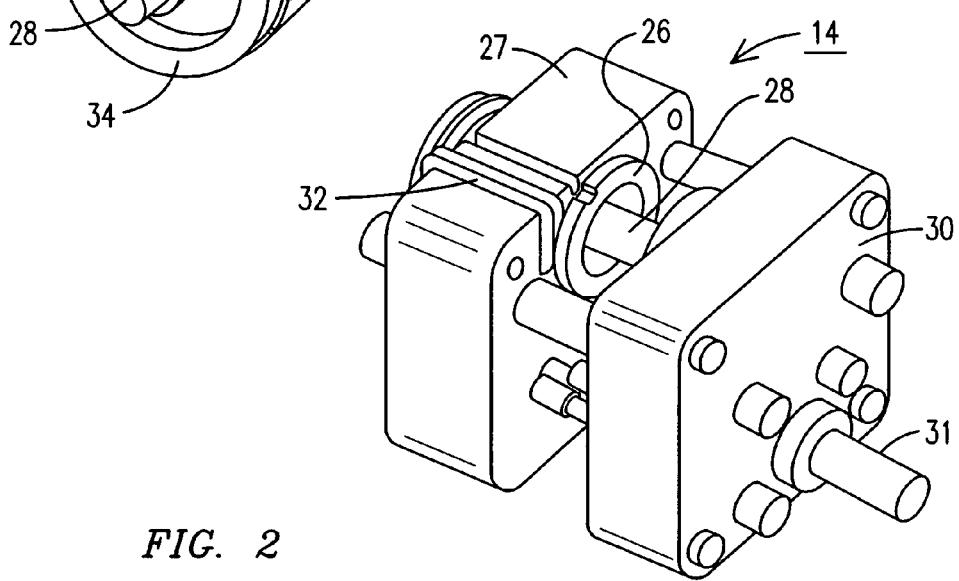
FIG. 2 is a perspective view of a shaded pole motor incorporating the improved rotor of the present invention.

Turning to FIGS. 2 and 3, the AC shaded pole motor 14 is illustrated in FIG. 2 and has a rotor 26 rotatably mounted in a stator 27 and having an output shaft 28 therefrom feeding into a gear box 30 which also has an output shaft 31. The rotor 26, as seen in FIG. 3, is a squirrel cage motor rotor 26. Shading coils 32 may be seen forming a part of the face of each pole and carries a copper ring called a shading coil. The shading coil produces a rotating magnetic field for starting the motor. The squirrel cage motor rotor, as seen in FIGS. 2 and 3, has had grooves 33 and 34 cut or formed therein across the iron surface of the rotor on each side of the rotor for use in a two-pole shaded motor. A four pole shaded pole motor might use four grooves. This groove into the rotor of the motor creates a stronger magnetic field when the groove and pole of the motor align under DC power. This allows the motor to hold a heavier load against the torque of the motor and allows the use of less power to hold light loads. This advantageously allows for the use of less energy.

Turning to FIGS. 2 and 3, AC shaded pole motor is illustrated in FIG. 2 having a rotor 26 rotatably mounted in a stator 27 and having an output shaft 28 therefrom feeding into a gear box 30 which also has an output shaft 31. The rotor 26, as seen in FIG. 3, is a squirrel cage rotor 28. Shading coils may be seen forming a part of the face of each pole and carries a copper ring called a shading coil. The shading coil produces a rotating magnetic field for starting the motor. The squirrel cage rotor, as seen in FIGS. 2 and 3, has had grooves 33 and 34 cut or formed therein across the surface of the rotor on each side of the rotor for use in a two-pole shaded motor. A four pole shaded pole motor might use four grooves. This groove into the rotor of the motor creates a stronger magnetic field when the groove and pole of the motor align under DC power. This allows the motor to hold a heavier load against the torque of the motor and allows the use of less power to hold light loads. This advantageously allows for the use of less energy.

Many applications require a drive and hold-type process, such as in the case of automatic fire dampeners which are held open using electric power until disrupted upon which they close by a spring. In the shaded pole motors of FIG. 2, the grooves cut in the rotor serves to create a stronger magnetic field when the groove and pole of the motor are aligned under DC power.

It should be clear at this time that an electric brake circuit for holding alternating a current motor rotor stationary has been provided which utilizes a smaller amount of energy and the locking of the rotor in place while provided the rotor with greater holding force. However, the present invention is not to be construed as limited to the forms shown which are to be considered illustrative rather than restrictive.

I claim:

1. An electric brake circuit for holding an alternating current induction motor rotor stationary comprising:
   an AC power source;
   an AC induction motor having a stator having at least one pole and a rotor connected to a motor shaft, said rotor having at least one groove formed therein positioned for alignment with said at least one motor pole;
   an AC to DC converter coupled to said AC source for converting AC to DC, said AC to DC converter being coupled to said AC induction motor;
   a brake actuator coupled between said AC power source and said AC induction motor for applying an alternating current to said AC induction motor in one position and to said AC to DC converter in a second position for braking and holding said AC induction motor rotor with each said rotor groove aligned with one said stator pole;
   whereby an AC induction motor has a DC holding brake for holding the rotor in a predetermined stationary position.

2. The electric brake circuit for holding an alternating current motor rotor stationary in accordance with claim 1 in which said AC induction motor is a shaded two pole AC induction motor.

3. The electric brake circuit for holding an alternating current motor rotor stationary in accordance with claim 1 in which said AC induction motor is a shaded four pole AC induction motor.

4. The electric brake circuit for holding an alternating current motor rotor stationary in accordance with claim 1 in which said actuator is a time delay relay.

5. The electric brake circuit for holding an alternating current motor rotor stationary in accordance with claim 1 in which said actuator is an electric switch.

6. The electric brake circuit for holding an alternating current motor rotor stationary in accordance with claim 1 having an AC induction motor shaft connected to a gear box output shaft.

7. The electric brake circuit for holding an alternating current motor rotor stationary in accordance with claim 1 in which at least one said rotor groove is parallel to said AC induction motor shaft.

8. The electric brake circuit for holding an alternating current motor rotor stationary in accordance with claim 7 in which said AC induction motor rotor has a plurality of cores and said at least one said rotor groove extends across a plurality of said cores.

* * * * *